United States Patent
Hombroek (10) Patent No.: US 10,612,175 B2
(45) Date of Patent: Apr. 7, 2020

(54) AUTOMATIC COLOR COMPOSITION DETECTION FOR LAUNDRY WASHING MACHINE

(71) Applicant: Midea Group Co., Ltd., Beijiao, Shunde, Foshan (CN)

(72) Inventor: Phillip C. Hombroek, Louisville, KY (US)

(73) Assignee: MIDEA GROUP CO., LTD., Beijiao, Shunde, Foshan, Guangdong (CN)

(*) Notice: Subject to any disclaimer, the term of this patent is extended or adjusted under 35 U.S.C. 154(b) by 169 days.

(21) Appl. No.: 15/718,938

(22) Filed: Sep. 28, 2017

(65) Prior Publication Data
US 2019/0093276 A1 Mar. 28, 2019

(51) Int. Cl.
*D06F 39/00* (2020.01)
*D06F 34/18* (2020.01)
(Continued)

(52) U.S. Cl.
CPC .............. *D06F 34/18* (2020.02); *D06F 34/28* (2020.02); *D06F 37/24* (2013.01); *D06F 37/304* (2013.01); *D06F 37/40* (2013.01); *D06F 39/02* (2013.01); *D06F 39/085* (2013.01); *D06F 39/088* (2013.01); *D06F 33/00* (2013.01);
(Continued)

(58) Field of Classification Search
CPC ...... D06F 33/02; D06F 39/003; D06F 39/005; D06F 58/28; D06F 39/004; D06F 2202/10; D06F 2058/2861; A47L 2501/30
USPC .......... 68/12.02, 12.04, 12.27, 12.05, 12.12, 68/12.01, 12.23, 13 R; 8/137, 158, 159
See application file for complete search history.

(56) References Cited

U.S. PATENT DOCUMENTS 5,739,534 A * 4/1998 Estenson ............... D06F 39/087
250/339.1
6,599,712 B1 * 7/2003 Sakakibara ............ C12Q 1/008
435/17
(Continued)

FOREIGN PATENT DOCUMENTS

CN 101484626 A 7/2009
CN 102272370 A 12/2011
(Continued)

OTHER PUBLICATIONS

"Bosch's stain scanner knows what you spilled on your shirt last night" www.engadget.com dated Sep. 2, 2017.
(Continued)

*Primary Examiner* — David G Cormier
*Assistant Examiner* — Thomas Bucci
(74) *Attorney, Agent, or Firm* — Middleton Reutlinger (57) ABSTRACT

A laundry washing machine and method automate the selection of one or more parameters of a wash cycle of a laundry washing machine based in part on a color detection sensor disposed proximate an opening of the wash tub and configured to capture color composition data of one or more items added to the wash tub and a weight sensor operatively coupled to the wash tub, where the weight sensor is configured to detect the addition of an item among the one or more items to the wash tub and initiate capturing of the color composition data, and a controller is configured to configure one or more parameters for a wash cycle based upon the captured color composition data.

18 Claims, 6 Drawing Sheets

(51) Int. Cl.
*D06F 37/24* (2006.01)
*D06F 37/30* (2020.01)
*D06F 37/40* (2006.01)
*D06F 39/08* (2006.01)
*D06F 39/02* (2006.01)
*D06F 34/28* (2020.01)
*G06T 7/90* (2017.01)
*D06F 39/12* (2006.01)
*D06F 33/00* (2020.01)

(52) U.S. Cl.
CPC ........ *D06F 39/12* (2013.01); *D06F 2202/085* (2013.01); *D06F 2202/10* (2013.01); *D06F 2202/12* (2013.01); *D06F 2204/02* (2013.01); *D06F 2204/06* (2013.01); *D06F 2204/084* (2013.01); *D06F 2204/088* (2013.01); *D06F 2204/10* (2013.01); *D06F 2210/00* (2013.01); *D06F 2212/02* (2013.01); *D06F 2222/00* (2013.01); *G06T 7/90* (2017.01)

(56) References Cited

U.S. PATENT DOCUMENTS

| | | | | |
|---|---|---|---|---|
| 6,784,997 | B2* | 8/2004 | Lorenz | D06F 39/003 356/429 |
| 7,400,407 | B2* | 7/2008 | Ng | A47L 15/4297 356/439 |
| 7,570,809 | B1 | 8/2009 | Srinivasa | |
| 7,904,985 | B2* | 3/2011 | Hendrickson | D06F 39/02 8/159 |
| 8,108,063 | B2 | 1/2012 | Agrawal et al. | |
| 8,528,230 | B2 | 9/2013 | Ashrafzadeh et al. | |
| 8,976,126 | B2* | 3/2015 | Kim | D06F 39/005 345/173 |
| 9,430,500 | B2 | 8/2016 | Choi et al. | |
| 2007/0299545 | A1 | 12/2007 | Agrawal et al. | |
| 2008/0236208 | A1* | 10/2008 | Miyata | D06F 35/001 68/5 C |
| 2008/0276655 | A1* | 11/2008 | Luckman | D06F 33/02 68/12.12 |
| 2008/0276964 | A1* | 11/2008 | Hendrickson | D06F 39/003 134/18 |
| 2008/0276965 | A1* | 11/2008 | Aykroyd | D06F 33/02 134/18 |
| 2010/0205820 | A1 | 8/2010 | Ashrafzadeh et al. | |
| 2013/0239337 | A1* | 9/2013 | Kim | D06F 39/003 8/137 |
| 2014/0241354 | A1 | 8/2014 | Shuman et al. | |
| 2014/0352077 | A1* | 12/2014 | Leitert | D06F 39/003 8/137 |
| 2014/0352078 | A1* | 12/2014 | Leitert | D06F 39/005 8/137 |
| 2015/0007394 | A1* | 1/2015 | Ashrafzadeh | D06F 33/02 8/137 |
| 2016/0119520 | A1 | 4/2016 | Park | |
| 2016/0160432 | A1* | 6/2016 | Ashrafzadeh | D06F 58/04 8/137 |
| 2016/0379176 | A1 | 12/2016 | Brailovskiy et al. | |

FOREIGN PATENT DOCUMENTS

| | | |
|---|---|---|
| CN | 103237935 A | 8/2013 |
| CN | 204898342 U | 12/2015 |
| CN | 105862324 A | 8/2016 |
| CN | 205975093 U | 2/2017 |
| DE | 102014113252 A1 | 3/2016 |
| EP | 2623661 A1 | 8/2013 |
| EP | 2985381 A1 | 2/2016 |
| ES | 2574554 A1 | 6/2016 |
| JP | 2003190688 A | 7/2003 |
| WO | 2008000812 A1 | 1/2008 |
| WO | WO-2008000812 A1 * | 1/2008 ........... D06F 39/003 |
| WO | 2010076157 A1 | 7/2010 |

OTHER PUBLICATIONS

"Marathon Laundry's Washer-Dryer is the Tesla of Appliances" www.wired.com dated Jan. 6, 2016.
"The secret of load detection in washing machines" http://blog.micro-epsilon.com dated Apr. 28, 2010.
"Washers & Dryers with Bosch Home Connect" www.bosch-home.co.uk retrieved on Mar. 21, 2017.
International Search Report and Written Opinion issued in Application No. PCT/CN2018/074256 dated Jul. 4, 2018.

\* cited by examiner

AUTOMATIC COLOR COMPOSITION DETECTION FOR LAUNDRY WASHING MACHINE

BACKGROUND

Laundry washing machines are used in many single-family and multi-family residential applications to clean clothes and other fabric items. Due to the wide variety of items that may need to be cleaned by a laundry washing machine, many laundry washing machines provide a wide variety of user-configurable settings to control various aspects of a wash cycle such as water temperatures and/or amounts, agitation, soaking, rinsing, spinning, etc. The cycle settings can have an appreciable effect on washing performance, as well as on energy and/or water consumption, so it is generally desirable for the settings used by a laundry washing machine to appropriately match the needs of each load washed by the machine.

Some laundry washing machines also support user selection of load types, typically based on the types of fabrics and/or items in the load. Some laundry washing machines, for example, have load type settings such as colors, whites, delicates, cottons, permanent press, towels, bedding, heavily soiled items, etc. These manually-selectable load types generally represent specific combinations of settings that are optimized for particular load types so that a user is not required to select individual values for each of the controllable settings of a laundry washing machine.

While manual load type selection in many cases simplifies a user's interaction with a laundry washing machine, such manual selection still can lead to suboptimal performance due to, for example, user inattentiveness or lack of understanding. Therefore, a significant need continues to exist in the art for a manner of optimizing the performance of a laundry washing machine for different types of loads, as well as reducing the burden on users when interacting with a laundry washing machine.

SUMMARY

The invention addresses these and other problems associated with the art by providing a laundry washing machine and method that automate the selection of one or more parameters for a wash cycle of a laundry washing machine based in part on color composition of the items to be added to the washing machine as determined by a color detection sensor.

In some instances, a laundry washing machine is disclosed, the laundry washing machine including: a wash tub disposed within a housing; a color detection sensor disposed proximate an opening of the wash tub and configured to capture color composition data of one or more items added to the wash tub; a weight sensor operatively coupled to the wash tub; and a controller coupled to the color detection sensor and the weight sensor and configured to detect an addition of an item among the one or more items to the wash tub with the weight sensor and initiate capturing of the color composition data with the color detection sensor responsive thereto, where the controller is further configured to configure one or more parameters for a wash cycle based upon the captured color composition data.

In some embodiments, the color detection sensor may comprise an image sensor configured to capture an image in response to changes in weight sensed by the weight sensor as additional items are added to the wash tub. In other embodiments, the color detection sensor may comprise an image sensor, and where the controller is configured to cause the image sensor to sequentially capture a plurality of images in response to changes in weight sensed by the weight sensor as additional items are added to the wash tub.

In some embodiments, the laundry washing machine may further include a retractable cover configured to selectively cover the color detection sensor. In other embodiments, the controller may be configured to initiate automatic retraction of the retractable cover in response to opening of a door that covers an opening of the wash tub, and trigger automatic closing of the retractable cover in response to closing of the door.

In some embodiments, the captured color composition data may include one or more images, and where the controller is further configured to detect a stain on an item among the one or more items added to the wash tub from the one or more images. In some embodiments, the controller may be further configured to recommend use of a stain removal tool to a user in response to detecting the stain. In other embodiments, the controller may be further configured to configure one or more parameters for the wash cycle in response to detecting the stain. In still other embodiments, the controller may be further configured to identify one or more characteristics of the stain detected and configure one or more parameters for the wash cycle in response to the identified one or more characteristics.

In some embodiments, the controller may be configured to select a load type from among a plurality of load types based upon the captured color composition data.

In some embodiments, the one or more parameters may include a wash or rinse temperature, a wash or rinse water amount, an agitation duration, an agitation stroke, a soak duration, a spin speed, a spin duration, a cycle time, or a number of phase repeats.

In some instances an apparatus is disclose, the apparatus including: an image sensor disposed on a mobile computing device and configured to capture one or more images of one or more items to be washed by a laundry washing machine; and a controller in communication with the image sensor and configured to process the one or more images to determine color composition data from the one or more images of the one or more items, the controller further configured to configure one or more parameters for a wash cycle of the laundry washing machine based upon the color composition data.

In some embodiments, the controller may be further configured to detect a stain on an item among the one or more items from the one or more images. In some embodiments, the controller may be further configured to recommend use of a stain removal tool to a user in response to detecting the stain. In other embodiments, the controller may be configured to configure one or more parameters for the wash cycle in response to detecting the stain. In still other embodiments, the controller may be configured to identify one or more characteristics of the stain sensed by the color detection sensor and configure the one or more parameters for the wash cycle in response to the one or more characteristics identified.

In some embodiments, the controller may be configured to select a load type from among a plurality of load types based upon the color composition data. In other embodiments, the one or more parameters may include a wash or rinse temperature, a wash or rinse water amount, an agitation duration, an agitation stroke, a soak duration, a spin speed, a spin duration, a cycle time, or a number of phase repeats.

In some embodiments, the controller may comprise a processor of the mobile computing device. In other embodiments, the controller may be disposed within the laundry washing machine. In still other embodiments, the controller may be external to and in communication with both the laundry washing machine and the mobile computing device.

In some instances, a laundry washing machine is disclosed, the laundry washing machine including: a wash tub disposed within a housing; a color detection sensor disposed proximate an opening of the wash tub and configured to capture color composition data of an item added to the wash tub; and a controller coupled to the color detection sensor and configured to detect a stain on the item added to the wash tub, where the controller is configured to configure one or more parameters for a wash cycle based on the stain detected.

In some embodiments, the controller may be configured to identify one or more characteristics of the stain sensed by the color detection sensor. In other embodiments, the controller may be further configured to recommend use of a stain removal tool to a user based on the one or more characteristics of the stain sensed by the color detection sensor. In still other embodiments, the one or more parameters may include a wash or rinse temperature, a wash or rinse water amount, an agitation duration, an agitation stroke, a soak duration, a spin speed, a spin duration, a cycle time, or a number of phase repeats.

In some instances, a laundry washing machine is disclosed, the laundry washing machine including: a wash tub disposed within a housing; a color detection sensor disposed proximate an opening of the wash tub and configured to capture color composition data of an item added to the wash tub; a retractable cover configured to selectively cover the color detection sensor; and a controller coupled to the color detection sensor and the retractable cover configured to initiate automatic retraction of the retractable cover in response to opening of a door that covers an opening of the wash tub and initiate capturing of the color composition data with the color detection sensor, where controller is further configured to configure one or more parameters for a wash cycle based upon the captured color composition data.

In some embodiments, the controller may be configured to initiate automatic closing of the retractable cover in response to closing of the door.

In some instances, a method of operating a laundry washing machine including a wash tub disposed within a housing, the method including: detecting weight of one or more items in the wash tub by a weight sensor operatively coupled to the wash tub; initiating, based on weight detection, capturing color composition data of the one or more items added to the wash tub by a color detection sensor; detecting a color composition of the one or more items added to the wash tub based on the color composition data captured by the color detection sensor; and configuring one or more parameters for a wash cycle based upon the color composition.

In embodiments, the color detection sensor may further comprise a camera disposed within the wash tub and a retractable cover covering the camera.

In some embodiments, the method may further comprise initiating automatic retraction of a retractable cover in response to opening of a door that covers an opening of the wash tub, and triggering automatic closing of the retractable cover in response to closing of the door.

In some embodiments, the method may further comprise detecting a stain on the one or more items added to the wash tub from the color composition data captured by the color detection sensor. In other embodiments, the method may further comprise identifying one or more characteristics of the stain detected. In still other embodiments, the method may further comprise recommending use of a stain removal tool to a user based on the identified characteristics of the stain. In some embodiments, the method may further comprise configuring one or more parameters for the wash cycle in response to detecting the stain.

In some instances, a method of operating a laundry washing machine is disclosed, the method including: receiving, in a controller, one or more images of one or more items to be washed by the laundry washing machine and captured by an image sensor disposed on a mobile computing device; processing the one or more images with the controller to determine color composition data from the one or more images; and configuring one or more parameters for a wash cycle of the laundry washing machine based upon the color composition data.

In some embodiments, the method may further comprise processing the one or more images with the controller to detect a stain on the one or more items to be washed by the laundry washing machine from the one or more images. In some embodiments, the method may further comprise identifying with the controller one or more characteristics of the stain detected. In other embodiments, the method may further comprise recommending, by the controller, use of a stain removal tool based on the one or more characteristic detected. In still other embodiments, the method may further comprise configuring one or more parameters for the wash cycle in response to detecting the stain.

In some instances, a method of operating a laundry washing machine including a wash tub disposed within a housing is disclosed, the method including: capturing color composition data of one or more items added to the wash tub by a color detection sensor; detecting a stain on the one or more items added to the wash tub based on the color composition data; and configuring one or more parameters for a wash cycle in response to detecting the stain.

In some embodiments, the method may further comprise recommending use of a stain removal tool to a user in response to detecting the stain. In some embodiments, the method may further comprise identifying one or more characteristics of the stain detected.

In some instances, a method of operating a laundry washing machine including a wash tub disposed within a housing is disclosed, the method including: initiating automatic retraction of a retractable cover configured to selectively cover a color detection sensor in response to opening of a door that covers an opening of the wash tub; capturing color composition data of one or more items added to the wash tub by the color detection sensor; detecting a color composition of the one or more items added to the wash tub based on the color composition data captured by the color detection sensor; and configuring one or more parameters for a wash cycle based upon the color composition data.

In some embodiments, the method may further comprise initiating automatic closing of the retractable cover in response to closing of the door.

DETAILED DESCRIPTION

Embodiments consistent with the invention may be used to automate the selection of a one or more parameters for a wash cycle of a laundry washing machine. In particular, in some embodiments consistent with the invention, a laundry washing machine may include in part a color detection sensor located proximate the opening of the wash tub and configured to capture color composition data of an item(s) added to the wash tub, a weight sensor operatively coupled to a wash tub, and a controller configured to detect the addition of an item(s) to the wash tub, to initiate the capturing of color composition data by the color detection sensor, and to configure one or more parameters for a wash cycle based on the captured color composition data. In other embodiments consistent with the invention, an apparatus may include an image sensor which may be located on a mobile computing device and configured to capture an image(s) of one or more items to be added to the wash tub and a controller in communication with the image sensor that may be configured to process the image(s) in order to determine the color composition of the one or more items to be washed and may be configured to determine one or more parameters of the wash cycle based on the color composition. In still other embodiments, as will become more apparent below, the color composition sensor may also be configured to detect a stain on the one or more items to be washed.

A parameter for a wash cycle, in this regard, may include any number of different configurable aspects of a wash cycle performed by a laundry washing machine including, but not limited to, a wash water temperature, a rinse water temperature, a wash water amount, a rinse water amount, a speed or stroke of agitation during washing and/or rinsing, a spin speed, whether or not agitation is used during washing and/or rinsing, a duration of a wash, rinse, soak, or spin phase of a wash cycle, a number of repeats of a wash, rinse, soak or spin phase, selection between different rinse operation types such as a spray rinse operation or a deep fill rinse operation, pre-treatment such as soaking over time with a prescribed water temperature and specific agitation stroke, etc. In some embodiments, either a user selection or automated selection of a load type (e.g. delicates, colors or whites, or the like) may result in the selection of one or more parameters corresponding to a wash cycle configured for that load type.

Numerous variations and modifications will be apparent to one of ordinary skill in the art, as will become apparent from the description below. Therefore, the invention is not limited to the specific implementations discussed herein.

Figures 1, 2:
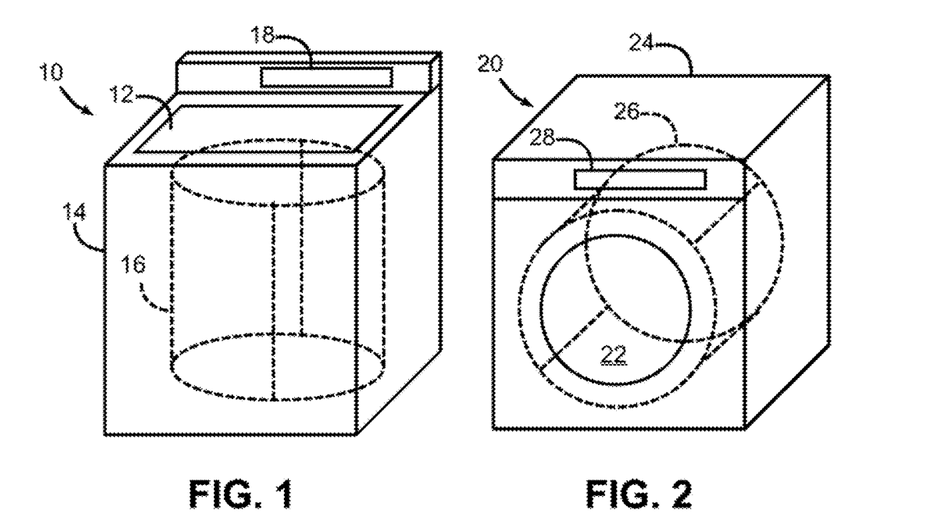
FIG. 1 is a perspective view of a top-load laundry washing machine consistent with some embodiments of the invention.
FIG. 2 is a perspective view of a front-load laundry washing machine consistent with some embodiments of the invention.

Tuning now to the drawings, wherein like numbers denote like parts throughout the several views, FIG. 1 illustrates an example laundry washing machine 10 in which the various technologies and techniques described herein may be implemented. Laundry washing machine 10 is a top-load washing machine, and as such includes a top-mounted door 12 in a cabinet or housing 14 that provides access to a vertically-oriented wash tub 16 housed within the cabinet or housing 14. Door 12 is generally hinged along a side or rear edge and is pivotable between the closed position illustrated in FIG. 1 and an opened position (not shown). When door 12 is in the opened position, clothes and other washable items may be inserted into and removed from wash tub 16 through an opening in the top of cabinet or housing 14. Control over washing machine 10 by a user is generally managed through a control panel 18 disposed on a backsplash and implementing a user interface for the washing machine, and it will be appreciated that in different washing machine designs, control panel 18 may include various types of input and/or output devices, including various knobs, buttons, lights, switches, textual and/or graphical displays, touch screens, etc. through which a user may configure one or more settings and start and stop a wash cycle.

The embodiments discussed hereinafter will focus on the implementation of the hereinafter-described techniques within a top-load residential laundry washing machine such as laundry washing machine 10, such as the type that may be used in single-family or multi-family dwellings, or in other similar applications. However, it will be appreciated that the herein-described techniques may also be used in connection with other types of laundry washing machines in some embodiments. For example, the herein-described techniques may be used in commercial applications in some embodiments. Moreover, the herein-described techniques may be used in connection with other laundry washing machine configurations. FIG. 2, for example, illustrates a front-load laundry washing machine 20 that includes a front-mounted door 22 in a cabinet or housing 24 that provides access to a horizontally-oriented wash tub 26 housed within the cabinet or housing 24, and that has a control panel 28 positioned towards the front of the machine rather than the rear of the machine as is typically the case with a top-load laundry washing machine. Implementation of the herein-described techniques within a front-load laundry washing machine would be well within the abilities of one of ordinary skill in the art having the benefit of the instant disclosure, so the invention is not limited to the top-load implementation discussed further herein.

Figure 3A:
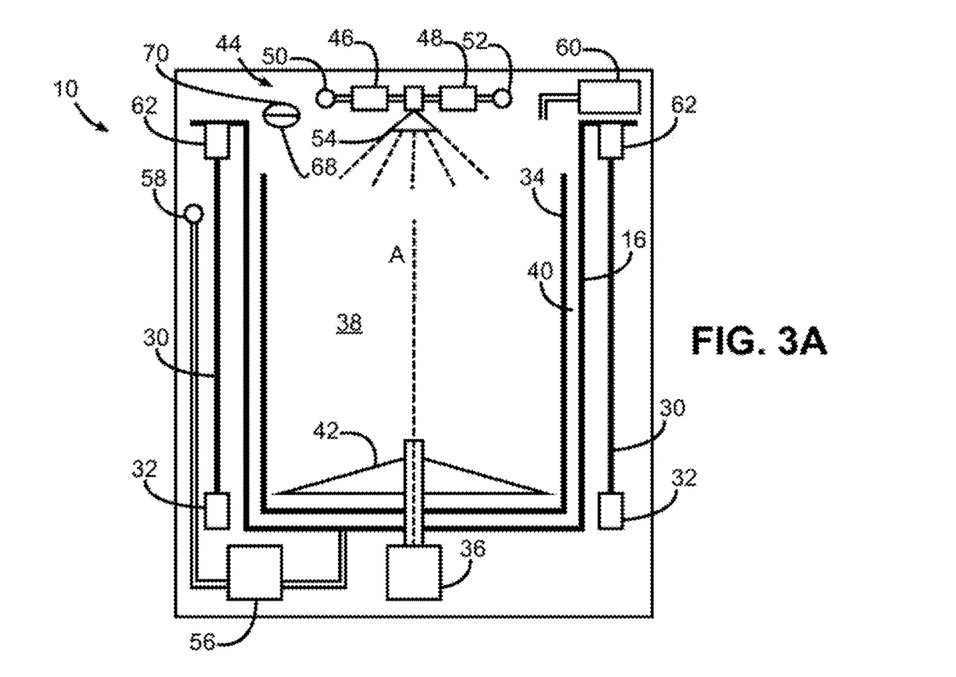
FIG. 3A is a functional vertical section of the laundry washing machine of FIG. 1.

FIG. 3A functionally illustrates a number of components in laundry washing machine 10 as is typical of many washing machine designs. For example, wash tub 16 may be vertically oriented, generally cylindrical in shape, opened to the top and capable of retaining water and/or wash liquor dispensed into the washing machine. Wash tub 16 may be supported by a suspension system such as a set of support rods 30 with corresponding vibration dampening springs 32.

Disposed within wash tub 16 is a wash basket 34 that is rotatable about a generally vertical axis A by a drive system 36. Wash basket 34 is generally perforated or otherwise provides fluid communication between an interior 38 of the wash basket 34 and a space 40 between wash basket 34 and wash tub 16. Drive system 36 may include, for example, an electric motor and a transmission and/or clutch for selectively rotating the wash basket 34. In some embodiments, drive system 36 may be a direct drive system, whereas in other embodiments, a belt or chain drive system may be used.

In addition, in some embodiments an agitator 42 such as an impeller, auger or other agitation element may be disposed in the interior 38 of wash basket 34 to agitate items within wash basket 34 during a washing operation. Agitator 42 may be driven by drive system 36, e.g., for rotation about the same axis as wash basket 34, and a transmission and/or clutch within drive system 36 may be used to selectively rotate agitator 42. In other embodiments, separate drive systems may be used to rotate wash basket 34 and agitator 42.

A water inlet 44 may be provided to dispense water into wash tub 16. In some embodiments, for example, hot and cold valves 46, 48 may be coupled to external hot and cold water supplies through hot and cold inlets 50, 52, and may output to one or more nozzles 54 to dispense water of varying temperatures into wash tub 16. In addition, a pump system 56, e.g., including a pump and an electric motor, may be coupled between a low point, bottom or sump in wash tub 16 and an outlet 58 to discharge greywater from wash tub 16.

In some embodiments, laundry washing machine 10 may also include a dispensing system 60 configured to dispense detergent, fabric softener, stain removing compositions, and/or other wash-related products into wash tub 16. Dispensing system 60 may be configured, in some embodiments, to dispense controlled amounts of wash-related products, e.g., as may be stored in a reservoir (not shown) in laundry washing machine 10. In other embodiments, dispensing system 60 may be used to time the dispensing of wash-related products that have been manually placed in one or more reservoirs in the machine immediately prior to initiating a wash cycle. Dispensing system 60 may also, in some embodiments, receive and mix water with wash-related products to form one or more wash liquors that are dispensed into wash tub 16. In still other embodiments, no dispensing system may be provided, and a user may simply add wash-related products directly to the wash tub prior to initiating a wash cycle.

It will be appreciated that the particular components and configuration illustrated in FIG. 3A is typical of a number of common laundry washing machine designs. Nonetheless, a wide variety of other components and configurations are used in other laundry washing machine designs, and it will be appreciated that the herein-described functionality generally may be implemented in connection with these other designs, so the invention is not limited to the particular components and configuration illustrated in FIG. 3A.

Further, in some embodiments, in order to configure one or more parameters of a wash cycle, laundry washing machine 10 may include at least a weight sensor and a color detection sensor. A weight sensor may be used to generate a signal that varies based in part on the mass or weight of the contents of wash tub 16. In the illustrated embodiment, for example, a weight sensor may be implemented in laundry washing machine 10 using one or more load cells 62 that support wash tub 16 on one or more corresponding support rods 30. Each load cell 62 may be an electro-mechanical sensor that outputs a signal that varies with a displacement based on load or weight, and thus outputs a signal that varies with the weight of the contents of wash tub 16. Multiple load cells 62 may be used in some embodiments, while in other embodiments, other types of transducers or sensors that generate a signal that varies with applied force, e.g., strain gauges, may be used. Furthermore, while load cells 62 are illustrated as supporting wash tub 16 on support rods 30, the load cells, or other appropriate transducers or sensors, may be positioned elsewhere in a laundry washing machine to generate one or more signals that vary in response to the weight of the contents of wash tub 16. In some embodiments, for example, transducers may be used to support an entire load washing machine, e.g., one or more feet of a machine. Other types and/or locations of transducers suitable for generating a signal that varies with the weight of the contents of a wash tub will be apparent to one of ordinary skill in the art having the benefit of the instant disclosure. In addition, in some embodiments, a weight sensor may also be used for vibration sensing purposes, e.g., to detect excessive vibrations resulting from an out-of-balance load. In other embodiments, however, no vibration sensing may be used, while in other embodiments, separate sensors may be used to sense vibrations.

Figure 3B:
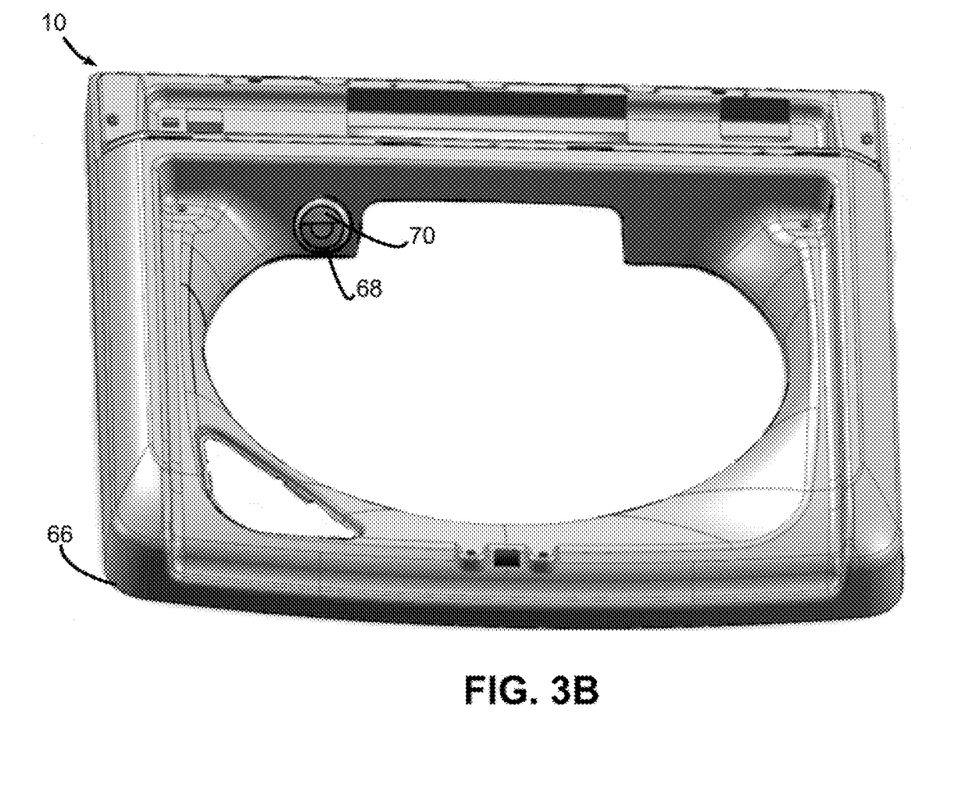
FIG. 3B is a top perspective view of a laundry washing machine top for the laundry washing machine of FIG. 1.

In some instances a color detection sensor 68 may be located proximate an opening of the wash tub 16 and may capture color composition data of one or more items. In such embodiments, the color detection sensor 68 may capture the color composition data as the item(s) are added to the wash tub 16, and thus, as illustrated in FIG. 3B, color detection sensor 68 in some embodiments may be generally upwardly facing and disposed in a top part 66 of a cabinet of a top load laundry washing machine, and in some instances may be located underneath of a door to the wash tub (not shown in FIG. 3B). In other embodiments, the color composition sensor 68 may be disposed on a mobile computing device, including, but not limited to, a smart phone, digital camera, smart watch, tablet, or the like. In such embodiments, the color composition data may be captured as the item(s) are added to the wash tub 16, or any time prior to that. For example, in some instances, it may be desirable to capture the color composition data as the item(s) become in need of laundering, or as the item(s) are added to a laundry hamper. Other positions for color detection sensor 68 may be used in other embodiments, e.g., on a door, directed inwardly into a wash tub, proximate a top edge of a door on a front-load laundry washing machine, and in other locations suitable for capturing data from items prior to, during, or after loading into a wash tub.

In some embodiments, the color detection sensor 68 may be an image sensor, or a camera. In some embodiments such an image sensor may be disposed on or in laundry washing machine 10, while in other embodiments such an image sensor may be disposed on a mobile computing device. In such embodiments, the color composition data may be in the form of an image captured by the image sensor. In other embodiments, color composition data may be an optical reading of the light composition of the item(s). In still other embodiments, the color composition data may be in the form of one or more color models, including, but not limited to the RGB color model, the CMKY color model, or the like. In such embodiments, the color composition data may be given a numerical value to represent the amount of each color (for example, in the RGB color model the amount of red, green, and/or blue) captured by the color detection sensor 68. One or more parameters of the wash cycle may be configured based on the color composition data. As a non-limiting example, where the color composition data indicates the items are brightly colored (e.g. red, orange, etc.), it may be desirable to utilize cold or cool water in order to minimize the bleeding and/or fading of the colors during the wash cycle.

In some embodiments, the color detection sensor 68 may be initiated in response to the weight of one or more items being added to wash tub, as sensed by the weight sensor. In other embodiments, the color detection sensor may sequentially capture (for example through an imagine sensor) color composition data in response to changes in weight detected by the weight sensor as items are added to the wash tub 16. In some instances, for example where there are many items to be washed, such a sequential capture of color composition data may be desirable in order to more accurately reflect the color composition of all items to be washed.

In some embodiments, the color detection sensor 68 may also be used to detect a stain on the item(s). In some embodiments, stain detection may be done in conjunction and/or simultaneously with capturing color composition data; while in other embodiments, stain detection and the capture of color composition data are separate and discrete functions of the color detection sensor 68. One or more parameters of the wash cycle may be configured based on the detection of a stain. As a non-limiting example, where a stain is detected, it may be desirable to utilize a pretreatment, such as a soak, in order to aid in removing the stain. In other embodiments, one or more characteristics of the detected stain may be determined, for example composition of the stain (e.g. oil, food, etc.) size of the stain, intensity or the stain, and the like. In still other embodiments, the use of a stain removal tool may be recommended (e.g., via a notification to a user via a user interface of the laundry washing machine or a mobile computing device) based on the characteristic(s) of the stain. In such embodiments, the stain removing tool may be stored within the laundry washing machine 10, until such a time as its use is recommended. The stain removing tool may then be deployed from this stored position and may receive at least a portion of an item containing the stain in order to remove or treat the stain with water (for example, via nozzles or brushes to spray and/or scrub the item). In some embodiments, a user may be instructed to present stains on clothing items to the color detection sensor by a user interface, or a user may be permitted to select an option via the user interface to indicate that the user is about to present a stain on a clothing item to the color detection sensor.

In some embodiments, a retractable cover 70 may selectively cover a color detection sensor 68 located proximate an opening of the wash tub 16, as illustrated in FIGS. 3A and 3B. In some embodiments, as illustrated in FIG. 3B, the color detection sensor 68 and retractable cover 70 may be located as a part of or proximate a top part 66 of the cabinet of laundry washing machine 10. Although illustrated in FIGS. 3A and 3B as only partially covering the color detection sensor 68 this is for illustrative purposely only, when in use a retractable cover 70 will generally translate between covering and exposing substantially all of the color detection sensor 68. In such embodiments, the retractable cover 70 may be configured to initiate automatic retraction in response to the door 12 covering the wash tub opening. In some embodiments, information from the door switch 82, which detects whether door 12 is in an open or closed position, may be utilized in initiating the automatic retraction of the retractable cover 70. In some instances, particularly where the color detection sensor 68 is disposed within the wash tub (as illustrated in FIGS. 3A and 3B), a retractable cover 70 may be particularly desirable as the color detection sensor 68 may be exposed to the water, detergent, and the like during the wash cycle. Various retractable cover designs may be used, e.g., slidable planar covers, iris-type covers, pivotable covers, etc.

In some embodiments, information from the door switch 82 may also be utilized in initiating the automatic closing of the retractable cover 70 in response to the closing of the door 12.

Although a weight sensor and a color detection sensor 68 are specifically discussed herein, this is not to be understood as limiting, as additional sensors may also be incorporated into a laundry washing machine 10. For example, in some embodiments, sensors may be used to measure turbidity, conductivity, temperature, and/or other sensors that may be incorporated in the laundry washing machine to measure additional characteristics.

Figure 4:
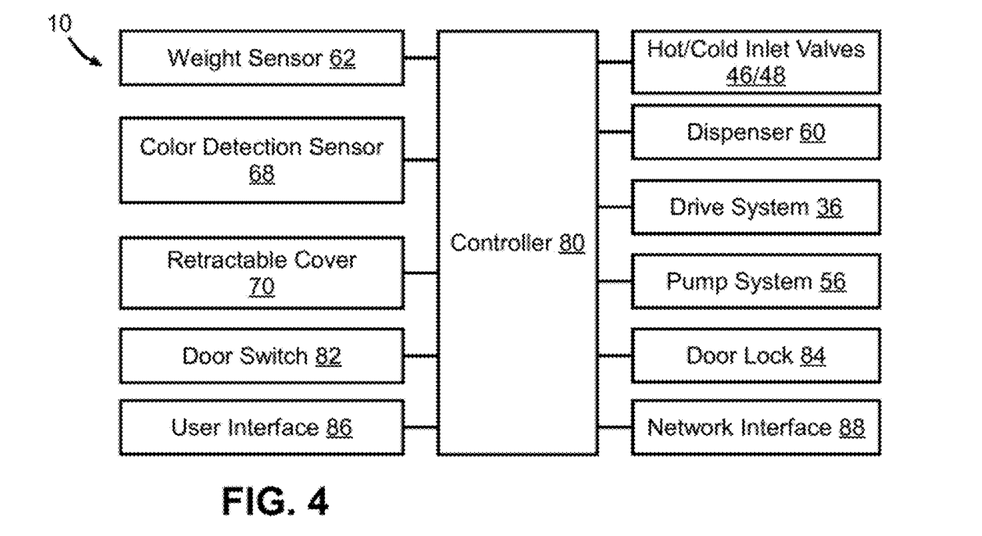
FIG. 4 is a block diagram of an example control system for the laundry washing machine of FIG. 1.

Now turning to FIG. 4, laundry washing machine 10 may be under the control of a controller 80 that receives inputs from a number of components and drives a number of components in response thereto. Controller 80 may, for example, include one or more processors and a memory (not shown) within which may be stored program code for execution by the one or more processors. The memory may be embedded in controller 80, but may also be considered to include volatile and/or non-volatile memories, cache memories, flash memories, programmable read-only memories, read-only memories, etc., as well as memory storage physically located elsewhere from controller 80, e.g., in a mass storage device or on a remote computer interfaced with controller 80.

As shown in FIG. 4, controller 80 may be interfaced with various components, including the aforementioned drive system 36, hot/cold inlet valves 46, 48, pump system 56, weight sensor 62, color detection sensor 68, and so on. In addition, controller 80 may be interfaced with additional components such as a door switch 82 that detects whether door 12 is in an open or closed position and a door lock 84 that selectively locks door 12 in a closed position. Moreover, controller 80 may be coupled to a user interface 86 including various input/output devices such as knobs, dials, sliders, switches, buttons, lights, textual and/or graphics displays, touch screen displays, speakers, image capture devices, microphones, etc. for receiving input from and communicating with a user. In some embodiments, controller 80 may also be coupled to one or more network interfaces 88, e.g., for interfacing with external devices via wired and/or wireless networks such as Ethernet, Bluetooth, NFC, cellular and other suitable networks. Additional components may also be interfaced with controller 80, as will be appreciated by those of ordinary skill having the benefit of the instant disclosure. Moreover, in some embodiments, at least a portion of controller 80 may be implemented externally from a laundry washing machine, e.g., within a mobile device, a cloud computing environment, etc., such that at least a portion of the functionality described herein is implemented within the portion of the controller that is externally implemented.

In some embodiments, controller 80 may operate under the control of an operating system and may execute or otherwise rely upon various computer software applications, components, programs, objects, modules, data structures, etc. In addition, controller 80 may also incorporate hardware logic to implement some or all of the functionality disclosed herein. Further, in some embodiments, the sequences of operations performed by controller 80 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

FIG. 4 illustrates an example control system for a laundry washing machine 10 described herein; however, it is to be understood that the location of the controller is not limited to the laundry washing machine 10 itself. In some embodiments, the controller may be disposed in a mobile computing device, server, or other device wirelessly connected to the laundry washing machine 10. Moreover, multiple devices, e.g., an embedded device in a laundry washing machine and a device networked thereto such as a mobile computing device may collectively implement the functions of controller 80, with different operations performed by the different devices alone or jointly with one another.

The typical operation of a laundry washing machine 10 includes a user determining various parameters for a wash cycle. Now turning to FIG. 5, and with continuing reference to FIGS. 3A, 3B and 4, an embodiment of a method 100 for operating a laundry washing machine 10 and automatically selecting of one or more parameters of the wash cycle based on the color composition of the items to be added to the wash tub is illustrated. It will be appreciated that wash cycles may vary in a number of respects that may be configured by method 100, or other exemplary methods disclosed herein. For example, additional phases, such as a pre-soak phase, may be included in some wash cycles, and moreover, some phases may be repeated, e.g., including multiple rinse and/or spin phases. Each phase may also have a number of different operational settings that may be varied for different types of loads, e.g., different times or durations, different water temperatures, different agitation speeds or strokes, different rinse operation types, different spin speeds, different water amounts, different wash product amounts, etc.

Figure 5:
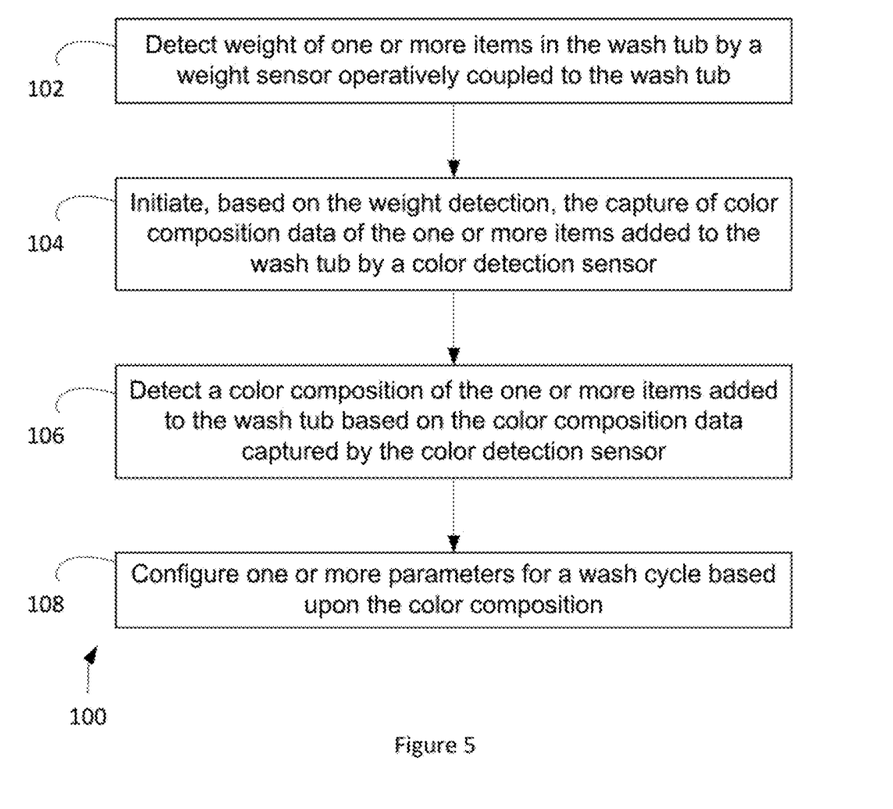
FIG. 5 is a flowchart illustrating an example sequence of operations for operating the laundry washing machine of FIG. 1.

In embodiments consistent with the invention, the operation of a laundry washing machine may include detecting the weight of one or more items in the wash tub 102 through use of a weight sensor that is coupled to the wash tub. Next, in block 104 the capture of color composition data of the items added to the wash tub by the color detection sensor 68 is initiated based on weight detection. When one or more items are added to the wash tub 16 (e.g. a shirt) the weight of the item(s) is detected by the weight sensor, and may initiate the capture of color composition data. In some embodiments, the color detection sensor 68 may further contain a camera and/or a retractable cover 70 that covers and protects the color detection sensor 68 when not in use; in some instances, this may be particularly desirable where the color detection sensor 68 is contained within the wash tub 16 and may be exposed to the water, detergent, and the like during the wash cycle. In such embodiments, the retractable cover 70 may be automatically retracted in response to the opening of the door 12 that covers the wash tub 16, and the retractable cover 70 may automatically close in response to the closing of the door 12 that covers the wash tub 16.

In block 106, a color composition of the item(s) added to the wash tub is detected based on the color composition data captured by the color detection sensor 68. In some embodiments, the color detection sensor 68 is configured to sequentially detect color composition data as the weight sensor detects additional items being added to the wash tub 16, this may be desirable where a larger number of items are added to the wash tub and may allow for more accurate data regarding color composition to be gathered. In block 108, one or more parameters of a wash cycle may be configured based on the detected color composition of the item(s) in the wash tub 16.

In some embodiments, particularly where the color detection sensor 68 contains an image sensor, one or more stains may be detected on the item(s) added to the wash tub by the image(s) taken by the image sensor. Once detected, various characteristics of the stain may be identified. Characteristics may include, but are not limited to, the composition of the stain (e.g. oil, food, bodily fluids, etc.), size of the stain, intensity or the stain, and the like. In some embodiments, a particular stain removal tool may be recommended based on the characteristics determined. Such a tool may be stored within the laundry washing machine 10 until its use is recommended. At such a time, the tool may be deployed from its storage position and may include the use of spraying and/or scrubbing to treat at least a portion of the item with the stain. In other embodiments, the wash cycle may automatically configure certain parameters in response to a stain being detected.

As described previously, a parameter for a wash cycle, in this regard, may include any number of different configurable aspects of a wash cycle performed by a laundry washing machine including, but not limited to, a wash water temperature, a rinse water temperature, a wash water amount, a rinse water amount, a speed or stroke of agitation during washing and/or rinsing, a spin speed, whether or not agitation is used during washing and/or rinsing, a duration of a wash, rinse, soak, or spin phase of a wash cycle, a number of repeats of a wash, rinse, soak or spin phase, selection between different rinse operation types such as a spray rinse operation or a deep fill rinse operation, pre-treatment such as soaking over time with a prescribed water temperature and specific agitation stroke, etc. In some embodiments, either a user selection or automated selection of a load type (e.g. delicates, colors or whites, or the like) may result in the selection of one or more parameters corresponding to a wash cycle configured for that load type.

Figure 6:
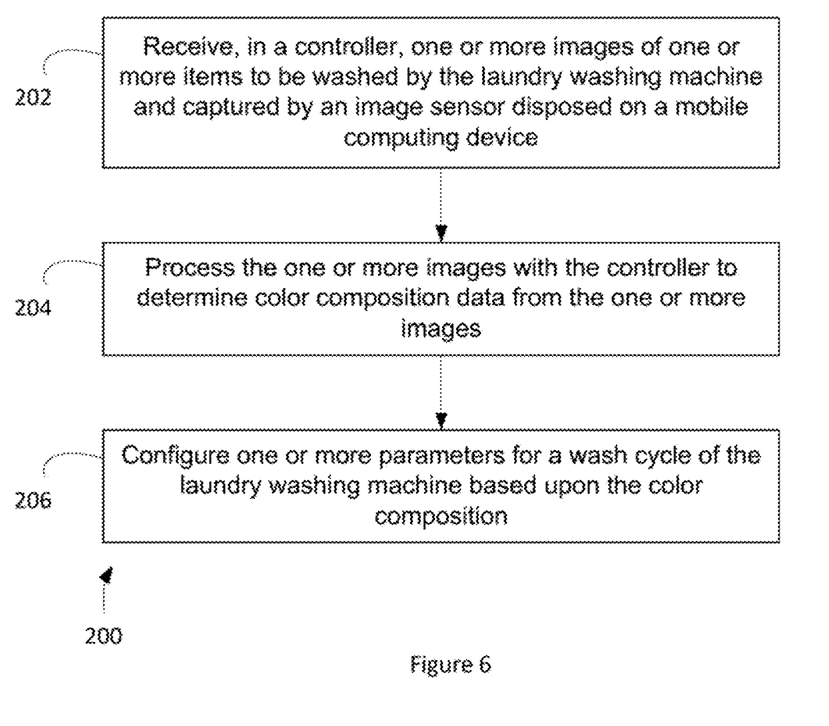
FIG. 6 is a flowchart illustrating another example sequence of operations for operating the laundry washing machine of FIG. 1.

FIG. 6 next illustrates another method of operating a laundry washing machine 200 consistent with the invention. In block 202, a controller receives one or more images captured by an image sensor disposed on a mobile computing device of one or more items to be washed by a laundry washing machine. In some embodiments, the controller may be disposed within the mobile computing device capturing the image(s). In other embodiments, the controller may be disposed with in the laundry washing machine 10. In still other embodiments, the controller may be disposed on a server, or other device, in wireless communication with the mobile computing device and laundry washing machine 10, and in other embodiments, multiple devices, e.g., the laundry washing machine and a mobile computing device or server, may perform different blocks of FIG. 6. In block 204, the image(s) may be processed by the controller to determine color composition data from the images(s). In block 206, one or more wash parameters may be configured for a wash cycle of the laundry washing machine based on the color composition data.

In some embodiments, the images may be taken and processed by the controller immediately prior to, or during, being added to the wash tub 16. In other embodiments, the images may be captured and stored before processing; for example, this may allow a user to capture one or more images as they are placed in a laundry hamper.

In some embodiments, the controller may further process the image(s) to detect a stain on the item(s) to be washed. Once detected, the controller may identify various characteristics of the stain. Characteristics may include, but are not limited to, the composition of the stain (e.g. oil, food, etc.) size of the stain, intensity or the stain, and the like. In some embodiments, the controller may recommend a particular stain removal based on the characteristics of the stain determined. Such a tool may be stored within the laundry washing machine 10 until its use is recommended. At such a time, the tool may be deployed from its storage position and may include the use of spraying and/or scrubbing to treat at least a portion of the item with the stain. In other embodiments, the controller may configure one or more parameters of the wash cycle in response to the detection of a stain.

Figure 7:
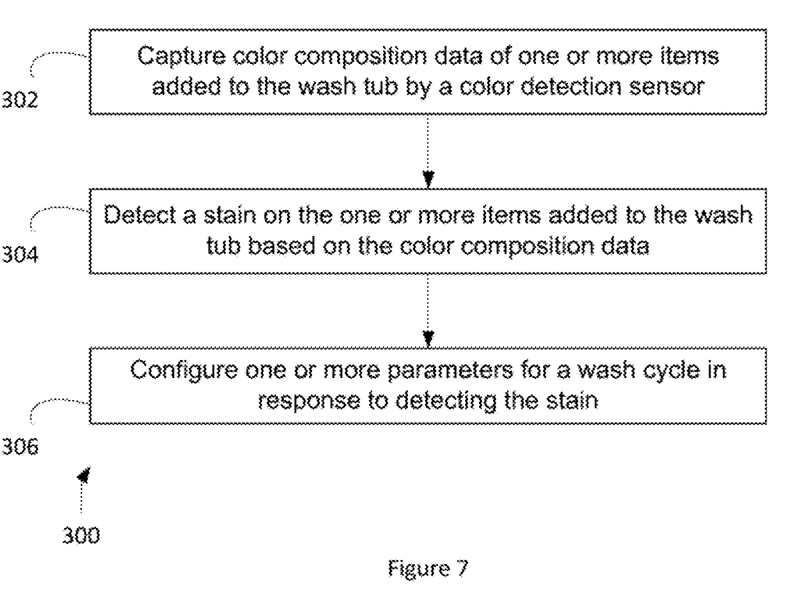
FIG. 7 is a flowchart illustrating another example sequence of operations for operating the laundry washing machine of FIG. 1.

FIG. 7 next illustrates another method of operating a laundry washing machine 300 consistent with the invention. In block 302, color composition data of one or more item(s) added to the wash tub 16. In block 304, based on the color composition data a stain may be detected on the item(s) added to the wash tub 16. In block 306 one or more parameters of the wash cycle may be configured in response to the detection of the stain. In some embodiments, various characteristics of the stain may be identified. Characteristics may include, but are not limited to, the composition of the stain (e.g. oil, food, etc.) size of the stain, intensity or the stain, and the like. In other embodiments, a particular stain removal may be recommended based on the characteristics of the stain. Such a tool may be stored within the laundry washing machine 10 until its use is recommended. At such a time, the tool may be deployed from its storage position and may include the use of spraying and/or scrubbing to treat at least a portion of the item with the stain.

Figure 8:
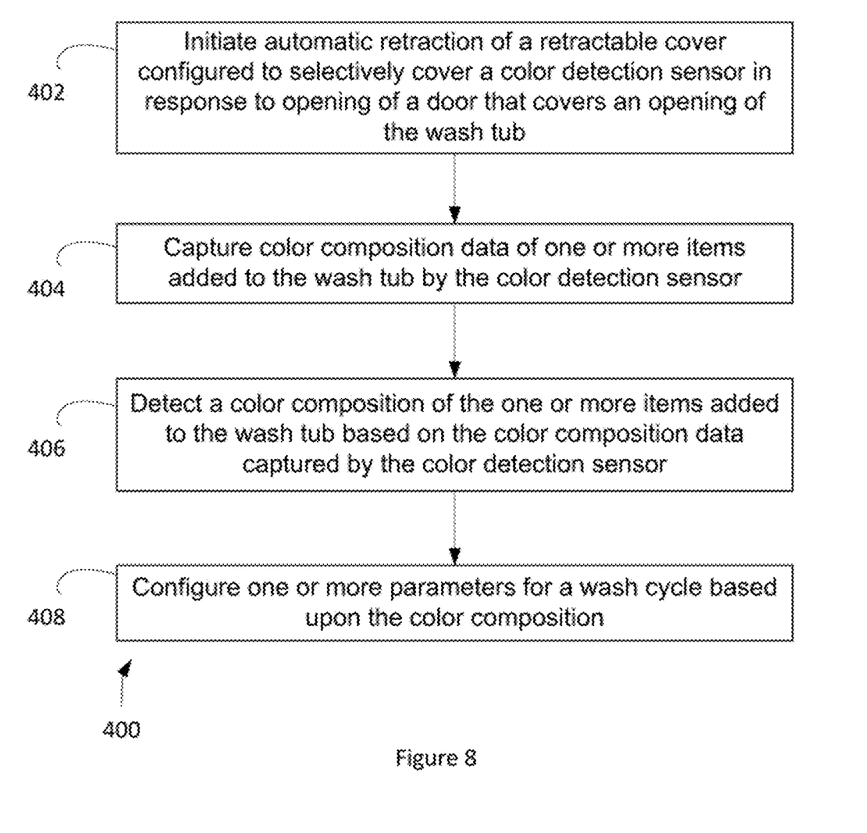
FIG. 8 is a flowchart illustrating another example sequence of operations for operating the laundry washing machine of FIG. 1.

Now turning to FIG. 8, an embodiment of a method 400 for operating a laundry washing machine 10 and automatically selecting of one or more parameters of the wash cycle based on the color composition of the items to be added to the wash tub 16 is illustrated. In embodiments consistent with the invention, the operation of a laundry washing machine 10 may include initiating automatic retraction 302 of a retractable cover 70, where the retractable cover 70 may be configured to selectively cover a color detection sensor 68. The initiation of the retraction of the cover 70 may be in response to the opening of a door 12 that covers the wash tub 16. In some embodiments, door switch 82 may provide the necessary signal that the door 12 has been opened.

Next, in block 404 the capture of color composition data of the items added to the wash tub 16 by the color detection sensor 68 occurs. In block 406, a color composition of the item(s) added to the wash tub 16 may be detected based on the color composition data captured by the color detection sensor 68. In some embodiments, the color detection sensor 68 may be configured to sequentially detect color composition data as the weight sensor detects additional items being added to the wash tub 16, this may be desirable where a larger number of items are added to the wash tub. In block 408, one or more parameters of a wash cycle may be configured based on the detected color composition of the items in the wash tub 16.

In some embodiments, method 400 may further include the automatic closing, or retraction, of the cover 70 in response to the door 12 covering the wash tub 16 closing. In some embodiments, door switch 82 may provide the necessary signal that the door 12 has been closed.

Various additional modifications may be made to the illustrated embodiments consistent with the invention. Therefore, the invention lies in the claims hereinafter appended.

What is claimed is:

1. A laundry washing machine, comprising:
a wash tub disposed within a housing;
a color detection sensor disposed proximate an opening of the wash tub and configured to capture color composition data of one or more items added to the wash tub;
a retractable cover configured to selectively cover the color detection sensor;
a weight sensor operatively coupled to the wash tub; and
a controller coupled to the color detection sensor, the retractable cover, and the weight sensor and configured to detect an addition of an item among the one or more items to the wash tub with the weight sensor, initiate automatic retraction of the retractable cover in response to opening of a door that covers the opening of the wash tub, and initiate capturing of the color composition data with the color detection sensor responsive thereto,
wherein the controller is further configured to configure one or more parameters for a wash cycle based upon the captured color composition data.

2. The laundry washing machine of claim 1, wherein the color detection sensor comprises an image sensor configured to capture an image in response to changes in weight sensed by the weight sensor as additional items are added to the wash tub.

3. The laundry washing machine of claim 1, wherein the color detection sensor comprises an image sensor, and wherein the controller is configured to cause the image sensor to sequentially capture a plurality of images in response to changes in weight sensed by the weight sensor as additional items are added to the wash tub.

4. The laundry washing machine of claim 1, wherein the controller is further configured to trigger automatic closing of the retractable cover in response to closing of the door.

5. The laundry washing machine of claim 1, wherein the captured color composition data includes one or more images, and wherein the controller is further configured to detect a stain on an item among the one or more items added to the wash tub from the one or more images.

6. The laundry washing machine of claim 5, wherein the controller is further configured to generate a recommendation to use a stain removal tool and communicate the recommendation to a user via a user interface or a mobile computing device in response to detecting the stain.

7. The laundry washing machine of claim 5, wherein the controller is further configured to configure one or more parameters for the wash cycle in response to detecting the stain.

8. The laundry washing machine of claim 5, wherein the controller is further configured to identify one or more characteristics of the stain detected and configure one or more parameters for the wash cycle in response to the identified one or more characteristics.

9. The laundry washing machine of claim 1, wherein the controller is configured to select a load type from among a plurality of load types based upon the captured color composition data, and wherein the controller is configured to configure the one or more parameters for the wash cycle based upon the selected load type.

10. The laundry washing machine of claim 1, wherein the one or more parameters include a wash or rinse temperature, a wash or rinse water amount, an agitation duration, an agitation stroke, a soak duration, a spin speed, a spin duration, a cycle time, or a number of phase repeats.

11. A laundry washing machine, comprising:
a wash tub disposed within a housing;
a color detection sensor disposed proximate an opening of the wash tub and configured to capture color composition data of an item added to the wash tub;
a retractable cover configured to selectively cover the color detection sensor;
a weight sensor operatively coupled to the wash tub; and
a controller coupled to the color detection sensor, the retractable cover, and the weight sensor and configured to detect a stain on the item added to the wash tub by detecting addition of the item to the wash tub with the weight sensor, initiating automatic retraction of the retractable cover in response to opening of a door that covers the opening of the wash tub, initiating capturing of the color composition data of the item added to the wash tub responsive to detecting the addition of the item to the wash tub with the weight sensor, and detecting the stain based upon the captured color composition data,
wherein the controller is configured to configure one or more parameters for a wash cycle based on the stain detected.

12. The laundry washing machine of claim 11, wherein the controller is configured to identify one or more characteristics of the stain sensed by the color detection sensor.

13. The laundry washing machine of claim 12, wherein the controller is further configured to generate a recommendation to use a stain removal tool and communicate the recommendation to a user via a user interface or a mobile computing device based on the one or more characteristics of the stain sensed by the color detection sensor.

14. The laundry washing machine of claim 11, wherein the one or more parameters include a wash or rinse temperature, a wash or rinse water amount, an agitation duration, an agitation stroke, a soak duration, a spin speed, a spin duration, a cycle time, or a number of phase repeats.

15. The laundry washing machine of claim 11, wherein the color detection sensor comprises an image sensor configured to capture an image in response to changes in weight sensed by the weight sensor as additional items are added to the wash tub.

16. The laundry washing machine of claim 11, wherein the color detection sensor comprises an image sensor, and wherein the controller is configured to cause the image sensor to sequentially capture a plurality of images in response to changes in weight sensed by the weight sensor as additional items are added to the wash tub.

17. A laundry washing machine, comprising:
a wash tub disposed within a housing;
a color detection sensor disposed proximate an opening of the wash tub and configured to capture color composition data of an item added to the wash tub;
a retractable cover configured to selectively cover the color detection sensor; and
a controller coupled to the color detection sensor and the retractable cover configured to initiate automatic retraction of the retractable cover in response to opening of a door that covers an opening of the wash tub and initiate capturing of the color composition data with the color detection sensor,
wherein controller is further configured to configure one or more parameters for a wash cycle based upon the captured color composition data.

18. The laundry washing machine of claim 17, wherein the controller is configured to initiate automatic closing of the retractable cover in response to closing of the door.

* * * * *